3,718,714
UNSATURATED POLYESTER COMPOSITIONS
Lowell R. Comstock, South Charleston, and Percy L. Smith, Dunbar, W. Va., assignors to Union Carbide Corporation, New York, N.Y.
No Drawing. Filed Sept. 16, 1970, Ser. No. 72,798
Int. Cl. C08f 37/16, 43/08
U.S. Cl. 260—862   23 Claims

ABSTRACT OF THE DISCLOSURE

The disclosure of this application is directed to unsaturated polyester compositions, containing a thermoplastic polymer of vinyl acetate having an average of at least one carboxyl group per molecule, which have particular utility in sheet molding applications to form thermoset articles characterized by excellent impact strength and by excellent surface properties such as excellent smoothness, excellent receptiveness to paints and excellent reproduction of the surface contours of the mold in which they are formed into shaped, thermoset articles.

This invention relates to unsaturated polyester compositions containing a polymer of vinyl acetate having an average of at least one carboxyl group per molecule. More specifically, this invention relates to unsaturated polyester compositions, as described, which have particular utility in sheet molding applications to form thermoset articles such as fenders, dash-boards and other like component parts of automobiles, characterized by excellent impact strength and by excellent surface properties including excellent smoothness, excellent receptiveness to paints and excellent reproduction of the surface contours of the mold in which they are formed into shaped, thermoset articles.

Compositions, based in unsaturated polyesters, are finding increased use in the automotive industry as compositions from which can be molded fenders, dash-boards and other like component parts of automobiles. As a general rule, these compositions contain, in addition to the unsaturated polyesters, so-called low-profile additives such as poly(methyl methacrylate). A low-profile additive is a material designed to insure that there is no undesirable shrinkage in the mold by the composition, to which the additive has been added, as the composition is being molded into a thermoset article. In other words, low-profile additives have been added to unsaturated polyester compositions for the purpose of obtaining compositions which can be molded into thermoset articles, the surfaces of which truly reflect the surface characteristics of the mold.

It has been found, however, that although the use of low-profile additives, as described, does effect some degree of improvement in the anti-shrinkage characteristics of the unsaturated polyester compositions, the improvement is more than offset by other problems, occasioned by these low-profile additives, when the compositions to which they have been added are to be used in sheet-molding applications. Sheet-molding applications involve forming the compositions into sheet material, winding the sheeted material into rolls, allowing the sheeted material to gel or B-stage and thereafter, as the need arises, unwinding and molding the sheeted material into thermoset articles of desired shape. Low-profile additives, as described, tend to migrate to and exude from the surfaces of the compositions during the gelling or B-staging operation. As a result, the sheeted compositions become oily and sticky, at their surfaces, and present obvious handling and processing problems.

The present invention provides unsaturated polyester compositions which, in addition to possessing the advantages previously discussed, can be formed into sheets and gelled or B-staged to surface-dry-material which can be readily and easily handled and processed.

The compositions of this invention comprise an unsaturated polyester and a thermoplastic polymer of vinyl acetate having an average of at least one carboxyl group per molecule, generally having an average of one to about ten carboxyl groups per molecule and preferably having one to about three carboxyl groups per molecule and wherein the polymer of vinyl acetate is present in an amount of about one to about 60 percent by weight and preferably about one to about 40 percent by weight based on the weight of the unsaturated polyester.

The unsaturated polyesters which are admixed with the polymers of vinyl acetate, as previously described, to provide the compositions of this invention are condensation reaction products of an unsaturated polycarboxylic acid and a polyol and generally have an average molecular weight of about 500 to about 10,000, preferably about 1,000 to above 6,000, which based on an acid number, have an acid number less than 100.

Illustrative of suitable unsaturated polycarboxylic acids which are condensed with the polyols to produce the unsaturated polyesters of this invention are those having the formula:

Formula I

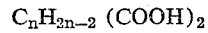

$$C_nH_{2n-2}(COOH)_2$$

wherein $n$ is an integer having a value of 2 to 20 inclusive, preferably 2 to 10 inclusive. Among such acids can be noted fumaric acid, maleic acid, glutaconic acid, citraconic acid, itaconic acid, ethidenemalonic acid, mesaconic acid, allylmalonic acid, propylidenemalonic acid, hydromuconic acid, pyrocinchonic acid, allyl succinic acid, carbocaprolactonic acid, teraconic acid, xeronic acids, etylmalonic acid and other like ethylenically unsaturated acids.

Other suitable unsaturated acids include 4-amyl-2,5-heptaldienedioic acid, 3-hexynedioic acid, tetrahydrophthalic acid, 3-carboxy cinnamic acid and the like.

If desired, the acid anhydrides of the acids previously described can be used per se or in admixture with the acids to produce the unsaturated polyesters of this invention.

In addition to the anhydrides of the acids noted above, the following acid anhydrides can also be used: pentenyl succinic anhydride, octenyl succinic anhydride, nonenyl succinic anhydride, chloromaleic anhydride, dichloromaleic anhydride, hexachloroendomethylene tetrahydrophthalic anhydride, commonly referred to as chlorendic anhydride, the Diels-Alder adducts of maleic acid and alicyclic compounds having conjugated double bonds such as methylbicyclo-[2,2,1] - hepten - 2,3-dicarboxylic anhydride and the like.

If desired, aromatic polycarboxylic acids, saturated poycarboxylic acids, anhydrides thereof or monocarboxylic acids can be used, in conjunction with the unsaturated polycarboxylic acids or the anhydrides thereof, to produce the unsaturated polyesters.

Illustrative of saturated polycarboxylic or aromatic polycarboxylic acids include, among others, phthalic acid, hexahydrophthalic acid, tetrachlorophthalic acid, succinic acid, adipic acid, suberic acid, azelaic acid, sebacic acid, dimethyl succinic acid and the like as well as derivatives thereof, e.g., chlorinated derivatives.

Among suitable monocarboxylic acids, which usually contain a maximum of twenty-two carbon atoms, are benzoic acid, hexanoic acid, caprylic acid, lauric acid, caproic acid, myristic acid, palmitic acid, stearic acid, arachidic acid, palmitoleic acid, oleic acid, linoleic acid, linolenic acid, eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated castor oil, coconut oil, cottonseed oil, linseed oil, oiticica oil, perilla oil, olive oil, safflower oil, sardine oil, soybean oil, tall oil, tung oil (China wood oil), and the like.

Illustrative of suitable polyols for purposes of this invention are the dihydric alcohols having the formula:

Formula II

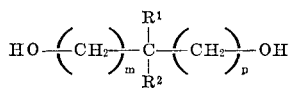

wherein the sum of $m+p$ is at least 1, preferably 1 to 20 inclusive and $R^1$ and $R^2$, which can be the same or different, are hydrogen or alkyl and when alkyl, containing 1 to 20 carbon atoms inclusive. Specific compounds include, among others, ethylene glycol, propylene glycol, butanediol-1,2, butanediol-1,3, butanediol-1,4, hexanediol-1,6, decanediol-1,10, neopentyl glycol and the like.

Also suitable are the ether diols having the general formula:

Formula III

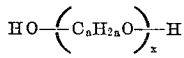

wherein $a$ has a value of at least 1, preferably 2 to 6 inclusive, and $x$ has a value of at least 2, preferably 2 to 10 inclusive. Among compounds falling within the scope of this formula are diethylene glycol, dipropylene glycol, triethylene glycol, tetraethylene glycol, and the like.

Other suitable polyols are the tetrahydric compounds such as pentaerythritol, dipentaerythritol, diglycerol, pentaglycerol, polyvinyl alcohol and the like.

Preparation of unsaturated polyesters can be carried out by methods well known in the art. As a rule, the condensation reaction is conducted by reacting a mixture containing an unsaturated polycarboxylic acid and a polyol, in an amount of about 2 to about 15 percent in molar excess with respect to the polycarboxylic acid, at temperatures on the order of about 160° C. to about 250° C., preferably about 175° C. to about 225° C., to polyesters having an acid number of less than about 100, generally about 10 to about 60, preferably about 25 to about 50.

As stated, the thermoplastic polymers of vinyl acetate suitable for purposes of this invention contain an average of at least one carboxyl group per molecule, generally an average of one to about 10 and preferably an average of one to about 3 carboxyl groups per molecule. On a weight basis, suitable thermoplastic polymers contain about 0.2 to about 5 percent by weight, preferably about 0.5 to about 2 percent by weight combined "carboxyl" compound. These polymers can be prepared in a number of ways, all well known in the art, by:

(1) Polymerizing vinyl acetate with a copolymerizable carboxylic acid to produce a copolymer having an average of at least one carboxyl group per molecule. Suitable copolymerizable carboxylic acids are the unsaturated polycarboxylic acids previously described (Formula I) as well as unsaturated monocarboxylic acids having the formula:

Formula IV $$C_aH_{2a-2}O_2$$

wherein $a$ is an integer having a value of 3 to 10 inclusive, preferably 3 to 6 inclusive. Exemplary of acids falling within the scope of Formula IV are the following: acrylic acid, methacrylic acid, crotonic acid, isocrotonic acid, vinyl acetic acid, tiglic acid, hexenic acid, and the like.

(2) Reacting poly(vinyl acetate) with a copolymerizable carboxylic acid, such as the acids described in (1) above to form a block copolymer or a grafted copolymer.

(3) Partially hydrolyzing poly(vinyl acetate) generally to a maximum value of twenty percent based on the total number of ester groups originally present and partially or totally esterifying the hydroxyl groups with a polycarboxylic acid or anhydride thereof as previously described in this specification.

In formulating the compositions of this invention which are to be used in molding applications such as sheet molding, premix and preform, it is customary to admix, with the unsaturated polyesters and the polymers of vinyl acetate, the following materials:

(1) A polymerizable ethylenically unsaturated monomer which serves to cross-link the unsaturated polyester to a thermoset product.

(2) A peroxide which serves to accelerate the cross-linking reaction.

(3) A thickening agent which serves to provide body to the compositions by increasing the viscosity of the polyesters.

(4) Fillers, including fillers which serve as reinforcing agents.

Illustrative of suitable polymerizable, ethylenically unsaturated monomers are the vinyl monomers having the formula:

Formula V $$CH_2=CH-R$$

wherein R is a group having an unsaturated carbon-to-carbon, carbon-to-oxygen, or carbon-to-nitrogen group in conjugation with the vinyl group. Groups having such unsaturation in conjugation with the vinyl group are aryl, ketonic, heterocyclic, nitrile, carbalkoxy, carboxy and amido.

Specific vinyl monomers include the following:

Wherein R is aryl; styrene, halogenated styrenes such as chlorostyrene, p-iodostyrene, m-fluorostyrene, dichlorostyrene and the like; alkyl substituted styrenes such as p-methyl styrene, p-ethyl styrene, o-tert-butyl styrene and the like; alkoxy and aryloxy substituted styrenes such as p-ethoxy styrene, p-propoxy styrene, p-phenoxy styrene and the like;

Wherein R is ketonic; ethyl vinyl ketone, n-propyl vinyl ketone, phenyl vinyl ketone and the like;

Wherein R is heterocyclic; vinyl pyridine, vinyl quinoline, vinyl pyrrole, vinyl carbazole, vinyl thiophene and the like;

Wherein R is nitrile; acrylonitrile and the like;

Where in R is amido; acrylamide, bicycloheptylacrylamide, diacetoneacrylamide and the like;

Wherein R is carboxy; acrylic acid and the like;

Wherein R is carbalkoxy; methyl acrylate, butyl acrylate, octyl acrylate, lauryl acrylate, cyclohexyl acrylate, phenyl acrylate, benzyl acrylate and the like.

Also suitable is diallylphthalate and the like.

The amount of ethylenically unsaturated monomer used can vary over wide limits. For example, the monomer can be used in amounts of about 10 to about 60 percent by weight-based on the combined weight of the monomer and the unsaturated polyester. It is preferred to use about 20 to about 50 percent by weight ethylenically unsaturated monomer, based on the combined weight of the mono- and unsaturated polyester.

Among suitable peroxides that can be used are those which function as free-radical polymerization initiators. Examples of such peroxides are the hydroperoxides such as tert-butyl hydroperoxide, cumene hydroperoxide, para-menthane hydroperoxide and the like; peroxy esters such as di-tert-butyl diperoxyphthalate, tert-butyl peroxyacetate and the like; alkyl peroxides such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide, 2,4-dichlorobenzoyl peroxide, lauroyl peroxide and the like.

The amount of peroxide used is sufficient to effect a cross-linking or thermosetting of the composition in a relatively short period of time. As a rule the amount used is about 0.1 to about 5 percent and preferably about 0.5 to about 2 percent by weight based on the weight of the unsaturated polyester.

Among suitable thickening agents are the oxides and hydroxides of metals of Groups I, II and IV of the Periodic Table (Handbook of Chemistry and Physics, 50th edition). Illustrative of specific oxides and hydroxides of the metals noted are the following: magnesium oxide, calcium oxide, zinc oxide, barium oxide, potassium oxide, magnesium hydroxide, calcium hydroxide, titanium oxide, lead oxide, and the like.

The thickening agents are used in amounts of about 0.5 to about 75 and preferably in amounts of about 1 to about 5 percent by weight based on the weight of the unsaturated polyester.

Fillers which are commonly employed in polyester compositions include, among others, glass fibers, clay, calcium carbonate, silica, hydrated alumina and the like. These materials are generally used in amounts of about 20 to about 80 percent by weight based on the weight of the polyester resin.

The compositions of this invention can be prepared by mixing the components in a suitable apparatus such as a Cowles dissolver, at temperatures on the order of about 23° C. to about 50° C.

Once formulated, the compositions can be formed into sheets using any suitable apparatus and thereafter molded into thermoset articles of desired shape, particularly thermoset articles such as automobile fenders, dash-boards and the like. The actual molding cycle will, of course, depend upon the exact composition being molded. Suitable molding cycles are conducted at temperatures on the order of about 250° F. to about 350° F. for periods of time ranging from about 0.5 minute to about 5 minutes.

The following examples further illustrate the present invention and are not intended to limit the scope thereof in any manner.

EXAMPLE 1

Into a reaction flask, equipped with a mechanical stirrer, thermometer, gas-inlet tube and steam condenser, there was charged maleic acid anhydride, phthalic acid and propylene glycol (propanediol-1,2) in a molar ratio of 3.0 moles of maleic acid anhydride, 1.0 mole of phthalic acid anhydride and 4.4 moles of propylene glycol. The mixture was heated to a temperature of 200° C. and maintained at 200° C., while under a nitrogen gas atmosphere, for 8 hours. At the end of 8 hours, the polyester produced, which had an acid number of 35, was cooled to a temperature of 150° C. and 0.014 percent by weight, based on the weight of polyester, hydroquinone added thereto. Styrene was then admixed with the unsaturated polyester to obtain a solution containing 30 percent by weight styrene.

Five hundred gram portions of the unsaturated resin-styrene solution, to which had been added 500 grams of calcium carbonate, were placed in a quart can and to each mixture there was then added 60 grams of a low-profile additive and an additional 90 grams of styrene. Each mixture was blended in a Cowles dissolver which was operating at a speed of 800 r.p.m. Blending was continued until the temperature of each blend reached 90° F.–95° F. At this point, 15 grams of calcium hydroxide were added to each mixture and blending was continued for 30 seconds. The mixtures were then placed in a water bath which was at a temperature of 100° F. and gelled or B-staged for sixty minutes to a thickened state.

The thickened compositions were then examined visually and the results thereof noted below along with the low-profile additive which was used in each composition.

| Composition | Results |
| --- | --- |
| Composition A.—Low-profile additive—a thermoplastic copolymer of vinyl acetate and acrylic acid containing 99.2 percent by weight combined vinyl acetate and 0.8 percent by weight combined acrylic acid. | Thickened with no migration of the low-profile additive to the surface. Surfaces were tack free. |
| Composition B.—Low-profile additive—a thermoplastic copolymer of poly(vinyl acetate) to which had been grafted acrylic acid. Copolymer contained 2 percent by weight combined acrylic acid. | Do. |
| Control 1.—Low-profile additive—thermoplastic poly(methyl methacrylate) having a reduced viscosity of 0.3. | The low-profile additive migrated to the surface. Surfaces were sticky. |

EXAMPLE 2

Five hundred gram portions of the unsaturated resin-styrene solution of Example 1 to which had been added 500 grams of calcium carbonate were placed in a quart can and to each mixture was then added 60 grams of a low-profile additive and an additional 90 grams of styrene. Each mixture was blended in a Cowles dissolver which was operating at a speed of 800 r.p.m. Blending was continued until the temperature of each blend reached 90° F.–95° F. At this point, 15 grams of calcium hydroxide, 35 grams of benzoyl peroxide and 105 grams of ¼ inch chopped glass fibers were added to each mixture and blending was continued for thirty seconds with a spatula. Each mixture was then cast into a sheet ⅛ inch thick and gelled or B-staged to a thickened state at room temperature.

The thickened compositions were then examined visually. The results of the visual examination are noted below, along with the low-profile additive which was used in each composition.

| Additive in composition tested | Results |
| --- | --- |
| Composition C.—Copolymer of vinyl acetate and acrylic acid—(same additive as in Composition A). | Thickened with no migration of the additive to the surface. Surfaces were tack free. |
| Composition D.—Poly(vinyl acetate) to which had been grafted acrylic acid—(same additive as in Composition B). | Do. |
| Control 2.—Poly(methyl methacrylate)—(same additive as in Control 1). | Additive migrated to surface. Surfaces were sticky. |

Compositions C and D were molded into plaques six inches by twelve inches by ⅛ inch in a matched mold utilizing the following molding cycle: 2 minutes at 275° C. under a pressure of 500 p.s.i.g.

The plaques were characterized by excellent impact strength and by excellent surface properties.

Also, the polyester-polymer of vinyl acetate-styrene solutions of this invention were completely compatible and as such can be prepared and utilized as a one-package system.

What is claimed is:

1. In a composition containing a vinyl monomer and an unsaturated polyester which is the condensation reaction product of a mixture containing an unsaturated polycarboxylic acid or anhydride thereof and a polyol and suitable for use in sheet molding applications, the improvement of utilizing as low profile additive to said composition a copolymer of vinyl acetate and acrylic or methacrylic acid wherein the combined acrylic or methacrylic acid content is about 0.2 to about 5 percent by weight.

2. A composition suitable for use in sheet molding applications comprising an unsaturated polyester, which is the condensation reaction product of an unsaturated polycarboxylic acid or anhydride thereof and a polyol, a vinyl monomer in an amount of about 10 to about 60 percent by weight based on the combined weight of said monomer and said polyester, a Group I, II or IV metal oxide or hydroxide thickener in an amount of 0.5 to about 75 percent by weight based on the weight of said polyester and a copolymer of vinyl acetate and acrylic or methacrylic acid wherein the combined acrylic or methacrylic acid content is about 0.2 to about 5 percent by weight, in an amount of about 1 to about 60 percent by weight based on the weight of said polyester.

3. A composition as defined in claim 2 wherein: the vinyl monomer is present in an amount of about 20 to about 50 percent by weight based on the combined weight of said monomer and said polyester; the Group I, II or IV metal oxide or hydroxide is present in an amount of about 1 to about 5 percent by weight based on the weight of said polyester; and the copolymer of vinyl acetate and acrylic or methacrylic acid is present in an amount of about 1 to about 40 percent by weight based on the weight of the unsaturated polyester.

4. A composition as defined in claim 2 wherein the unsaturated polyester is the condensation reaction product of a mixture containing a polyol, an unsaturated polycarboxylic acid or anhydride thereof and an aromatic polycarboxylic acid.

5. A composition as defined in claim 2 wherein the said copolymer is a copolymer of vinyl acetate and acrylic acid.

6. A composition as defined in claim 2 wherein the combined acrylic or methacrylic acid content of the copolymer is about 0.5 to about 2 percent by weight.

7. A composition as defined in claim 2 wherein the said copolymer is a copolymer of vinyl acetate and methacrylic acid.

8. A composition as defined in claim 2 wherein the copolymer of vinyl acetate is poly(vinyl acetate) to which has been grafted acrylic acid.

9. A composition as defined in claim 2 wherein the thickener is a Group II metal oxide.

10. A composition as defined in claim 2 wherein the thickener is a Group II metal hydroxide.

11. A composition as defined in claim 2 wherein the thickener is a Group IV metal oxide.

12. A composition as defined in claim 2 wherein the thickener is a Group IV metal hydroxide.

13. A composition as defined in claim 2 wherein the thickener is calcium hydroxide.

14. A composition as defined in claim 2 wherein the unsaturated polyester is a condensation reaction product of a polyol and an acid having the formula:

$$C_nH_{2n-2}(COOH)_2$$

wherein $n$ is an integer having a value of 2 to 20 inclusive.

15. A composition as defined in claim 2 wherein the unsaturated polyester is the condensation reaction product of a polyol and an acid having the formula:

$$C_nH_{2n}(COOH)_2$$

wherein $n$ is an integer having a value of 2 to 10 inclusive.

16. A composition as defined in claim 2 wherein the polyol has the formula:

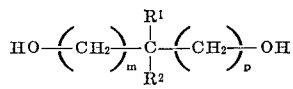

wherein the sum of $m+p$ equals at least one, $R^1$ and $R^2$ are hydrogen or alkyl.

17. A composition as defined in claim 2 wherein the polyol has the formula:

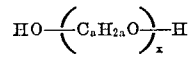

wherein $a$ has a value of at least one, $x$ has a value of at least 2.

18. A composition as defined in claim 2 wherein the polyol is ethylene glycol and the acid is fumaric acid.

19. A composition as defined in claim 2 wherein the polyol is propylene glycol and the acid anhydride is maleic acid anhydride.

20. A composition as defined in claim 2 wherein the vinyl monomer is styrene.

21. The thermoset product of free radical polymerization of the composition defined in claim 2.

22. A composition as defined in claim 2 wherein the thickener is a Group I metal oxide.

23. A composition as defined in claim 2 wherein the thickener is a Group I metal hydroxide.

References Cited

UNITED STATES PATENTS

| | | | |
|---|---|---|---|
| 2,628,209 | 2/1953 | Fisk | 260—861 X |
| 2,819,248 | 1/1958 | Casebolt | 260—862 |
| 3,129,110 | 4/1964 | Anderson | 117—37 |
| 3,432,458 | 3/1969 | Kwan et al. | 260—33.4 |
| 2,464,568 | 3/1949 | Flynn et al. | 175—21 |
| 2,498,621 | 2/1950 | Kropa et al. | 260—2.5 |
| 3,227,665 | 1/1966 | Fourcade et al. | 260—2.5 |
| 3,389,192 | 6/1968 | Ziegler | 260—862 |
| 3,527,722 | 9/1970 | Carlson et al. | 260—22 |

FOREIGN PATENTS

| | | |
|---|---|---|
| 6710031 | 1/1968 | Netherlands. |

OTHER REFERENCES

Skeist, "Handbook of Adhesives," pp. 365–6, Van Nostrand, 1962.

Kirk-Othmer, "Encyclopedia of Chemical Technology," vol. 20, pp. 834–5, Wiley, 2d ed., 1969.

South African Patent Journal, vol. 3, November 1970, p. 191—article re S. African Pat. No. 69/7,214.

WILLIAM H. SHORT, Primary Examiner

E. A. NIELSEN, Assistant Examiner